No. 674,790. Patented May 21, 1901.
W. F. MULLANEY.
VALVE.
(Application filed Sept. 15, 1900.)
(No Model.)

WITNESSES:
Edward Thorpe
P. B. Owens

INVENTOR
William F. Mullaney,
BY
ATTORNEYS

THE NORRIS PETERS CO., PHOTO-LITHO., WASHINGTON, D. C.

UNITED STATES PATENT OFFICE.

WILLIAM F. MULLANEY, OF MARSHALL, MINNESOTA, ASSIGNOR OF ONE-HALF TO ARCHIE A. HAWES, OF SAME PLACE.

VALVE.

SPECIFICATION forming part of Letters Patent No. 674,790, dated May 21, 1901.

Application filed September 15, 1900. Serial No. 30,121. (No model.)

*To all whom it may concern:*

Be it known that I, WILLIAM F. MULLANEY, a citizen of the United States, and a resident of Marshall, in the county of Lyon and State of Minnesota, have invented certain new and useful Improvements in Valves, of which the following is a full, clear, and exact description.

This invention relates to a valve which is constructed so that it may be operated either by pressure applied directly thereto by sliding its stem or by pressure applied by the action of a screw formed on the stem. In the former case the valve may be operated quickly, and in the latter case great force may be brought to bear on the valve, although it cannot be operated so rapidly.

This specification is the specific disclosure of one form of my invention, while the claims define the actual scope thereof.

Reference is to be had to the accompanying drawings, forming a part of this specification, in which similar characters of reference indicate corresponding parts in all the figures.

Figure 1:
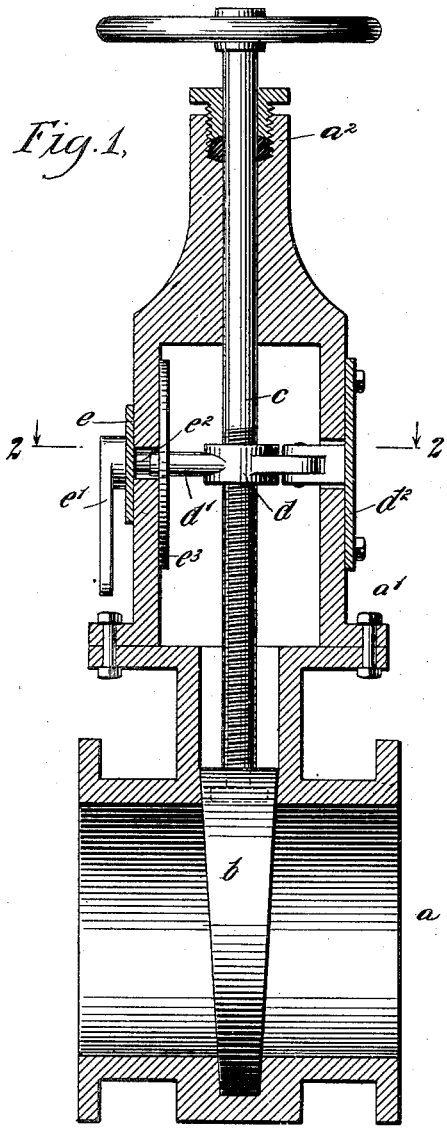
Figure 2:
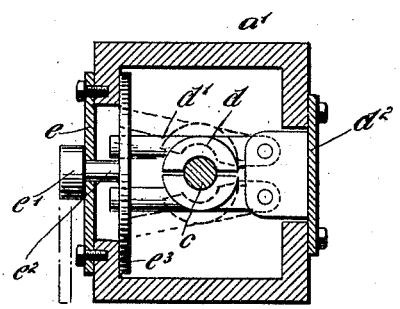
Figure 3:
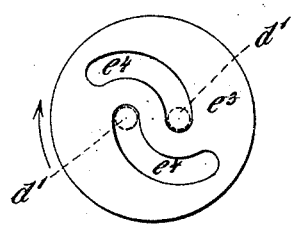

Figure 1 is a vertical section of the invention. Fig. 2 is a cross-section on the line 2 2 of Fig. 1; and Fig. 3 is a face view of the disk with the eccentric slots, the purpose of which will hereinafter appear.

$a$ represents the valve-casing, and $a'$ a housing formed thereon.

$b$ represents the valve, (which is here shown in the form of a gate,) and $c$ represents the valve-stem, which extends through the housing, the lower end of the stem being connected with the valve, so that the stem may turn thereon, and the upper end of the stem being freely movable through a packing-box $a^2$ at the top of the housing $a'$. The stem $c$ is threaded at points within the housing $a'$ and works with a sectional nut $d$, the parts of which engage opposite sides of the stem and respectively are carried on arms $d'$, pivoted to a plate or closure $d^2$, secured to the outer face of the housing and covering an opening in the adjacent wall thereof. The parts $d$, $d'$, and $d^2$ are placed *in situ* by projecting the arms and nut-sections through the opening in the housing $a'$ to their position within the sleeve, and then by fastening the plate $d^2$ in place the opening in the housing is closed and the nut-sections and their arms are firmly supported.

Opposite the plate $d^2$ the housing $a'$ is formed with a horizontally-elongated opening covered by a plate $e$, fastened to the outer surface of the housing. The plate $e$ furnishes a bearing for the rocking spindle $e^2$, which has at its outer end an operating-arm $e'$ and at its inner end (within the housing) a disk $e^3$, formed with eccentric slots $e^4$, wherein respectively are received the free ends of the arms $d'$. By turning the spindle $e^2$ the disk $e^3$ may be turned, and by this means the arms $d'$, with their nut-sections, may be moved toward or from each other to engage or disengage the nut-sections with or from the threaded portion of the stem $c$.

When the parts are thrown so as to engage the nut-sections $d$ with the stem $c$, (see full lines in Fig. 2,) the valve can be operated only by turning the stem $c$ as a screw; but when the nut-sections are thrown outward (see dotted lines in Fig. 2) the valve may be operated by sliding the stem, and consequently the valve, without involving the action of the nut. In this latter case the valve after it is adjusted may be held in the desired position by throwing the nut-sections into gear with the stem $c$, whereupon the nut acts as a lock to hold the valve.

Having thus described my invention, I claim as new and desire to secure by Letters Patent—

1. A valve provided with a threaded valve-stem connected with the valve proper, and a releasable nut device working with the valve-stem, to engage and disengage the same and permit the operation of the stem with or without the coaction of the nut device.

2. A valve provided with a slidable and turnable threaded stem connected with the valve proper, and a releasable nut device working with the stem, to engage and disengage the same and permit the stem to be operated with or without the coaction of the said nut device.

3. A valve provided with a slidable and turnable threaded stem connected with the valve proper, a nut-section adapted to coact with the threaded portion of the stem, and means for carrying the nut-section to move to engage or disengage the stem.

4. A valve provided with a slidable and turnable threaded stem connected with the valve proper, a nut-section adapted to coact with the threaded portion of the stem and mounted to swing toward and from the same, and a member mounted to turn and having an eccentric-like formation thereon engaged by a part of the nut-section, to swing the same.

In testimony whereof I have signed my name to this specification in the presence of two subscribing witnesses.

WILLIAM F. MULLANEY.

Witnesses:
GEORGE LITTLE,
C. J. NYLEN.